United States Patent [19]

Hiller et al.

[11] Patent Number: 4,744,596
[45] Date of Patent: May 17, 1988

[54] GRIPPING DEVICE

[75] Inventors: Norbert Hiller, Wendlingen; Walter Horny, Nuertingen, both of Fed. Rep. of Germany

[73] Assignee: Heller Maschinenfabrik GmbH, Nuertingen, Fed. Rep. of Germany

[21] Appl. No.: 71,962

[22] Filed: Jul. 10, 1987

[30] Foreign Application Priority Data

Jul. 12, 1986 [DE] Fed. Rep. of Germany ....... 3623586

[51] Int. Cl.[4] .............................................. B25J 15/08
[52] U.S. Cl. ...................................... 294/88; 294/115
[58] Field of Search ................. 294/88, 106, 115, 116; 29/568; 269/30, 32, 34, 228; 414/729, 732, 739, 741, 744 A, 751, 753; 901/31, 36, 37, 39

[56] References Cited

U.S. PATENT DOCUMENTS

| | | |
|---|---|---|
| 2,800,355 | 7/1957 | Vinner et al. .......................... 294/88 |
| 3,635,514 | 1/1972 | Blatt ..................................... 294/106 |
| 3,729,102 | 4/1973 | Shumaker . | |
| 4,304,433 | 12/1981 | Langowski .......................... 294/106 |
| 4,397,605 | 8/1983 | Cowgill et al. ................... 294/88 X |
| 4,531,772 | 7/1985 | Ronconi ............................... 294/115 |

FOREIGN PATENT DOCUMENTS

| | | |
|---|---|---|
| 2647945 | 4/1978 | Fed. Rep. of Germany . |
| 3343765 | 5/1985 | Fed. Rep. of Germany . |
| 1180265 | 9/1985 | U.S.S.R. ................................ 294/88 |

*Primary Examiner*—Johnny D. Cherry
*Attorney, Agent, or Firm*—Foley & Lardner, Schwartz, Jeffery, Schwaab, Mack, Blumenthal & Evans

[57] ABSTRACT

The gripping device has two gripping arms which are directly connected to one another in a pivotable manner about a common axis. A stop member is positioned in front of the pivot axis. Both gripping arms are pivotally connected to a piston rod of a piston-cylinder unit via toggle levers. The piston rod is displaceable relative to the pivot axis so that the gripping arms can be extended in a single displacement movement and pivoted into their gripping position.

9 Claims, 4 Drawing Sheets

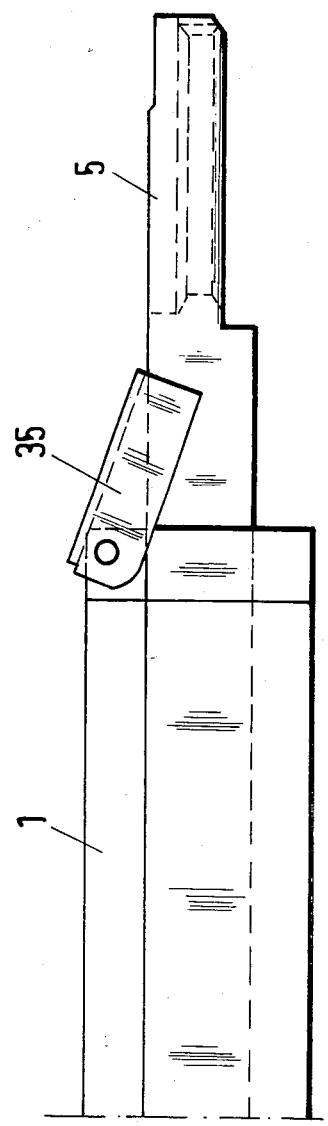

GRIPPING DEVICE

BACKGROUND OF THE INVENTION

The invention relates to a gripping device having gripping arms which can be moved to and from a gripping position for firmly gripping a tool or workpiece.

A gripping device is disclosed in German Offenlegungsschrift No. 2,647,945 in which the gripping arms, via in each case two toggle levers, are connected in an articulated manner to a wedge block which forms part of the drive for the gripping arms. The wedge block itself is displaced by two levers, each of which in turn interacts with a displaceable pin. This gripping device has a very complicated construction and is also susceptible to trouble as a result of the plurality of parts. Assembling this gripping device is complicated and expensive.

In another known gripping device disclosed in German Patent Specification No. 3,343,765 curved guideways in which the gripping arms are guided are provided for the gripping arms in the housing. They are provided with sliding blocks which engage into a groove of a slide running at right angles to the displacement direction of the gripping arms. With this slide, the gripping arms are displaced into the inoperative position or into the gripping position. The curved guideways and the gripping arms following them require true-to-size production, otherwise the gripping arms will jam in the groove-shaped guides. This gripping device is therefore susceptible to trouble during operation.

SUMMARY OF THE INVENTION

The object of the invention is to provide a gripping device of the general type described consisting of a relatively few components, and wherein the gripping arms, without keeping to especially close production tolerances, can be moved without trouble in reciprocating manner between the inoperative position and the gripping position.

The arms are moved by a piston rod which can be extended in order to move the gripping arms from their inoperative position into the gripping position. At the same time, the two gripping arms are driven along and displaced in the housing by toggle levers. This displacement movement by means of the piston rod can be executed effortlessly. As soon as the pivot axis, which is common to both gripping arms, interacts with a stop, the gripping arms cannot be displaced further. But the piston rod can be displaced further relative to this pivot axis. The consequence of this is that the gripping arms are pivoted into the gripping position about the pivot axis for gripping the tool or workpiece, as is known per se from U.S. Pat. No. 3,729,102. With the piston rod, the gripping arms can therefore be extended in a single displacement movement out of the housing and pivoted into their gripping position. In the gripping position, the gripping arms are locked via the piston rod so that they grip the tool or workpiece in a reliably tight manner.

Further features of the invention will be apparent from the following description in particular reference to the drawings.

BRIEF DESCRIPTION OF THE APPLICATION DRAWINGS

The invention is described in greater detail with reference to an exemplary embodiment shown in the drawings, in which:

FIG. 1 shows a gripping device according to the invention, the gripping arms of which are located in the inoperative position in which they are fully retracted into a housing of the gripping device, FIG. 2 shows the gripping device according to FIG. 1 in which the gripping arms are located just in front of their gripping position, FIG. 3 shows the gripping device according to FIG. 1 in which the gripping arms are located in the gripping position, and FIG. 4 shows in schematic representation the gripping device in side view.

DETAILED DESCRIPTION OF THE PREFERRED EMBODIMENT

Figure 1:
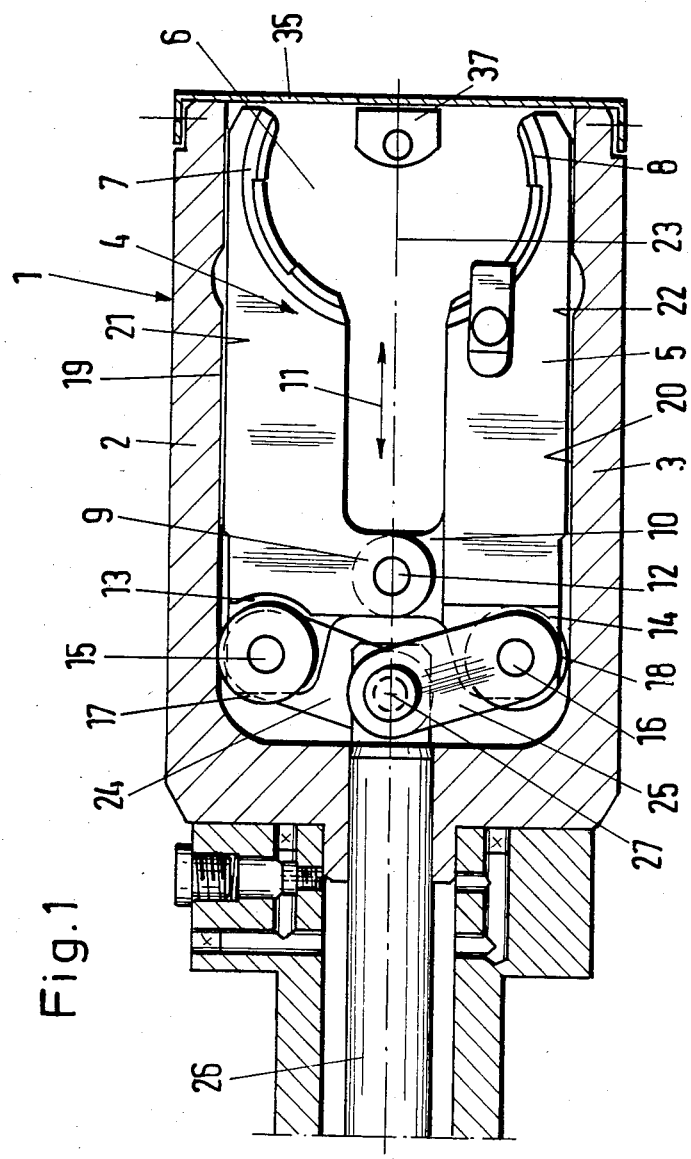

Tools and/or workpieces are gripped with the gripping device of the present invention. The gripping device has a housing 1 essentially rectangular in cross section and having side walls 2 and 3 which lie parallel to one another and on which gripping arms 4 and 5 are guided when being moved from the inoperative position (FIG. 1) into the gripping position (FIG. 3), and vice-versa. The thickness of the gripping arms 4 and 5 corresponds to the inside depth of the housing 1 so that the gripping arms can be positioned in the housing with a slight clearance from the bases 6 located opposite one another, with only the bottom base being shown in FIG. 1. The gripping arms 4 and 5 are provided with flat outer sides.

At their ends opposite the gripping ends 7 and 8, the gripping arms are provided with two apertured lugs 9 and 10 which point toward one another and through which passes a pin 12 lying at right angles to the displacement direction 11. It forms the common pivot axis for the two gripping arms 4 and 5. In addition, they are provided in each case with a further lug 13 and 14, respectively, projecting rearwardly in the displacement direction 11 and adjacent to the housing side walls 2 and 3. Passing through the lugs 13 and 14 are spindles 15 and 16, respectively, which are parallel to the pin 12. At least one roller 17 and 18 is mounted on each lug in a freely rotatable manner. When the gripping arms 4 and 5 are displaced, the rollers 17 and 18 roll on the inner sides 19 and 20 of the housing side walls 2 and 3. In order to keep the friction between the gripping arms 4 and 5 and the housing side walls 2 and 3 as small as possible, the gripping arms bear against the housing side walls only with the rollers 17 and 18. The flat outer sides 21 and 22 of the arms run parallel to the housing side walls at a slight distance therefrom. As a result of the rolling friction, the gripping arms can be displaced effortlessly and without jamming.

The spindles 15 and 16 are at a distance from a longitudinal plane of symmetry 23 of the gripping device, with the axis of the pin 12 lying in such plane.

Two toggle levers 24 and 25 are articulated on the gripping arms 4 and 5 by means of the spindles 15 and 16. In addition, the toggle levers 24 and 25 are articulated on the free end of a piston rod 26, the axis of which lies in the longitudinal plane 23 of symmetry. Starting from their articulated point 27 on the piston rod 26, the toggle levers 24 and 25 diverge from one another at an obtuse angle. The articulated point 27, like the axis of the pin 12, lies in the longitudinal plane 23 of symmetry.

The piston rod 26 carries a control piston 28 (FIG. 2) which is displaceable in a cylinder 29 attached to the housing 1. Leading into the cylinder space 30 is a bore 31 which is connected to an outlet 33 via a transverse bore 32. In addition, this outlet 33 is connected to the cylinder space 30 in a line via a choke point 34.

In the initial position, the gripping arms 4 and 5 are located in the inoperative position shown in FIG. 1, in which they lie completely inside the housing and do not project beyond its end face. A closure flap 35 is pivotally mounted on the housing (FIGS. 1 and 4) and is under spring force, completely closing the end face of the housing 1 in the inoperative position of the gripping arms 4 and 5 (FIG. 1). To extend the gripping arms 4 and 5, the control piston 28 is pressurized so that the piston rod 26 is extended. It passes through a rear wall 36 of the housing 1 on which the cylinder 29 is fixed. The pressure medium located on the piston rod side of the cylinder space 30, when the piston rod 26 extends, is displaced through the bore 31 and the transverse bore 32 into the outlet 33. When the gripping arms are extended, the rollers 17 and 18 roll on the inner sides 19 and 20 of the housing side walls 2 and 3. During displacement, the closure flap 35 is automatically pivoted by the gripping arms 4 and 5 into its open position (FIG. 4) against spring force.

Figure 2:
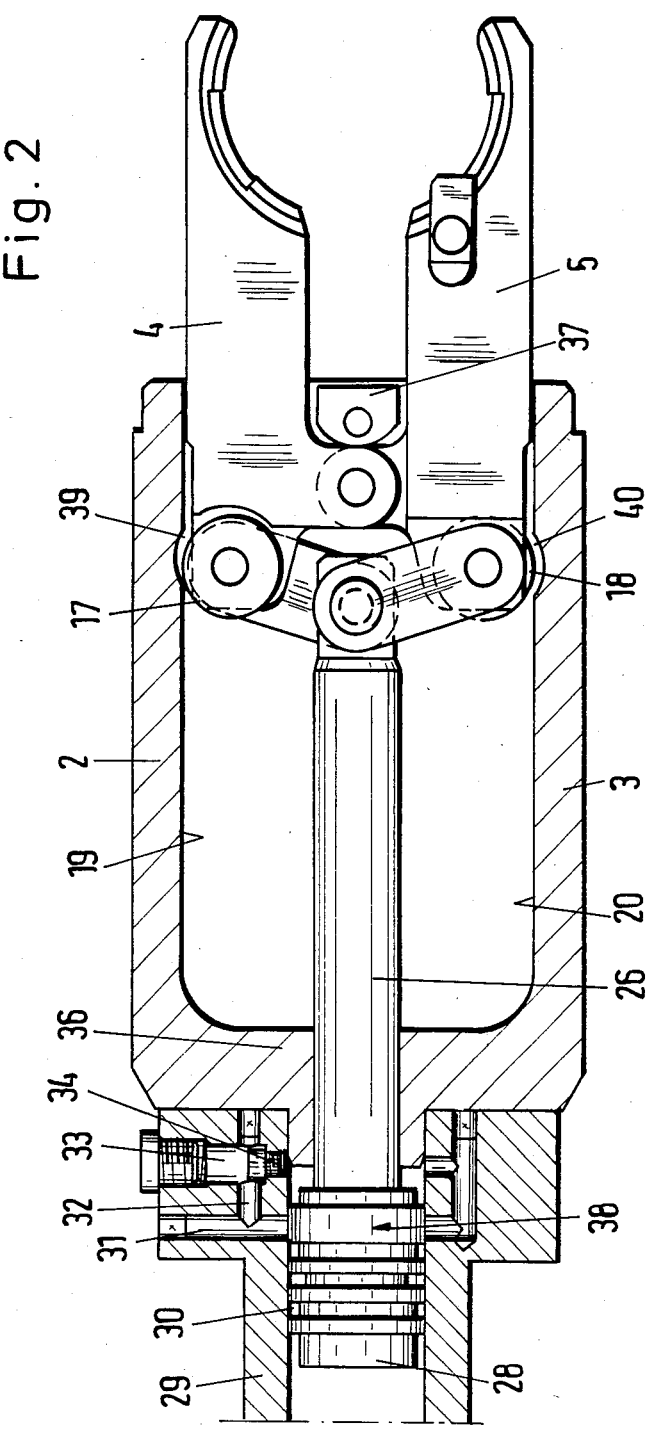
Figure 3:
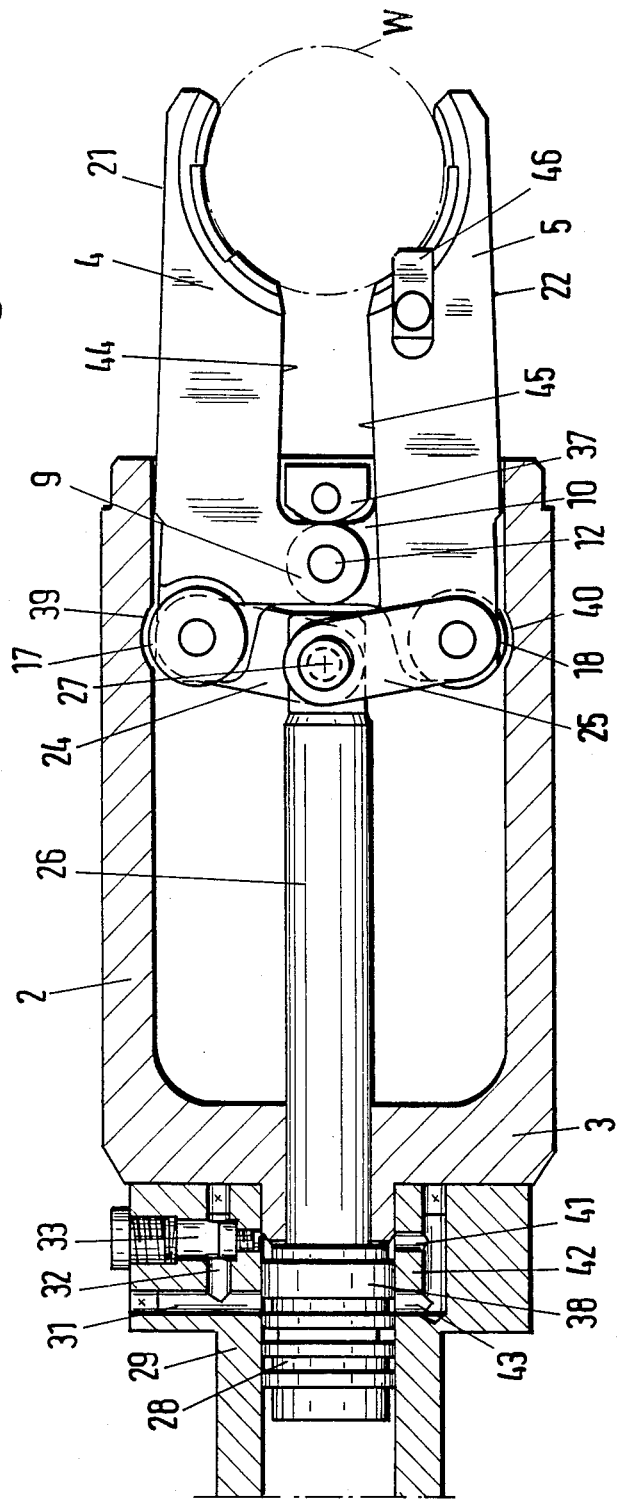

To limit the displacement travel of the piston rod 26 or the gripping arms 4 and 5, a stop 37 is provided on the base 6 of the housing 1, and the lugs 9 and 10 of the gripping arms 4 and 5 run up against this stop 37. Just before this stop position is reached, a control edge 38 of the control piston 28 passes over the bore 31 and closes it. (See FIG. 2.) Thus, the pressure medium located in front of the control piston 28 can no longer be displaced via the bore 31 but only via the choke point 34. But this automatically reduces the extension speed of the piston rod 26 so that the lugs 9 and 10 move slowly against the stop 37 (FIG. 2). In this stop position, the rollers 17 and 18 lie opposite circular-segment-shaped recesses 39 and 40 formed in the inner surfaces of the sides 19 and 20 of the housing side walls 2 and 3. As soon as the stop position according to FIG. 2 is reached, the control edge 38 of the control piston 28 again clears the bore 31 (FIG. 3) so that the pressure medium can again be displaced via the bore 31 and the transverse bore 32 to the outlet 33. The piston rod 26 is then extended again in an accelerated manner into its end position (FIG. 3). During this phase, the pressure medium can pass from the area in front of the control edge 38 of the control piston 28 to the bore 31 via a bore 41, an adjoining transverse bore 42 and a further adjoining bore 43 in the cylinder 29. Since the lugs 9 and 10 of the gripping arms 4 and 5 bear against the stop 37 during this last displacement phase, the toggle levers 24 and 25 are pivoted relative to one another when the piston rod 26 extends further, with the articulated point 27, which can be formed by a pin, being displaced toward the lugs 9 and 10. The gripping arms 4 and 5 are thereby pivoted toward one another about the pin 12, with the rollers 17 and 18 plunging into the recesses 39 and 40 of the housing side walls 2 and 3. In order to facilitate the pivoting movement of the gripping arms 4 and 5, their outer sides 21 and 22 are inwardly offset in the area of the recesses 39 and 40 (FIG. 3). The pivoting operation of the gripping arms 4 and 5 is complete when either the gripping arms come to bear against the workpiece W or the tool or, if there is a gripping action under no load, the rollers 17 and 18 butt against the base of the recesses 39 and 40. Alternatively, if there is a gripping action under no load, the end of the pivoting movement of the gripping arms 4 and 5 can be reached by limiting the piston travel. The inner sides 44 and 45 of the gripping arms 4 and 5 which face one another are at a distance from the stop 37 so as not to impair the pivoting movement of the gripping arms. In the gripping position according to FIG. 3, the arms 4 and 5 grip around a workpiece or tool W.

To release the workpiece and/or tool, the piston rod 26 is retracted by correspondingly pressurizing the piston 28. In this connection, the toggle levers 24 and 25 are again pivoted toward one another, because the rollers 17 and 18 come out of the recesses 39 and 40 during retraction. At the same time, the gripping arms 4 and 5 are pivoted about the pin 12 into their position according to FIG. 2. By the retraction of the piston rod 26 into the inoperative position according to FIG. 1, the gripping arms 4 and 5 are then pushed into the housing 1. The cover flap 35, which rests under spring force on the gripping arms during displacement, automatically closes the open end face of the housing 1 when the gripping arms are retracted into the housing 1 so that the inside of the housing and the gripping arms are protected from contamination and/or damage.

In order to extend the gripping arms 4 and 5 out of the housing 1 and bring them into their gripping position, the piston rod 26 merely needs to be extended. Only a single movement is therefore needed in order to extend and pivot the gripping arms. Since the gripping arms 4 and 5 are extended out of the housing essentially parallel to one another and are then pivoted toward one another, the distance between the tools and/or workpieces to be gripped can be very small without thereby impairing reliable gripping. In the gripping position, the gripping arms 4 and 5 are automatically locked by the connection between the piston rod and the toggle levers so that the gripped tools or workpieces are reliably held.

The gripping arm 5 is if necessary provided with an anti-turning device 46 which engages into a corresponding notch in the tool to be gripped and prevents the latter from turning. The gripping device described is characterized by a very simple design, since only a few components are necessary. The gripping device is therefore less susceptible to trouble during operation and guarantees a long operating life. As a result of its compact design, the gripping device also requires only a small amount of space.

What is claimed is:

1. A gripping device for gripping tools, workpieces or the like, comprising:
   (a) a housing,
   (b) a pair of gripping arms, mounted in said housing, said arms being pivotally mounted to each other adjacent their inner ends about a pivot axis,
   (c) piston-cylinder means movable longitudinally in said housing,
   (d) lever means pivotally connected both to said piston-cylinder means and to said gripping arms in such a manner that said piston-cylinder means is longitudinally displaceable relative to said pivot axis, and
   (e) stop means on said housing in alignment with said pivot axis and forwardly thereof, whereby
   forward movement of said piston-cylinder means causes said gripping arms to move correspondingly forward until said gripping arms in the region of said pivot axis engage said stop means, with continued movement of said piston-cylinder means causing said lever means to rotate and move said gripping arms into a gripping position.

2. The gripping device as claimed in claim 1, wherein said gripping arms have lugs which point toward one another and are connected to one another by a pin forming said pivot axis.

3. The gripping device as claimed in claim 2, wherein said gripping arms are formed with further lugs, and said lever means comprises a pair of toggle levers pivotally connected to said further lugs, said further lugs being transversely spaced from said pivot axis.

4. The gripping device as claimed in claim 1, further including means for guiding said gripping arms under rolling friction on side walls of the housing.

5. The gripping device as claimed in claim 4, wherein said guiding means comprises at least one roller mounted on each gripping arm, which roller engages the adjacent side walls of the housing.

6. The gripping device as claimed in claim 5, wherein said rollers are mounted in a freely rotatable manner on said further lugs of said gripping arms, said rollers, when said gripping arms are moved into the gripping position, bearing against the housing side walls under the force exerted by the piston rod of said piston-cylinder means through said lever means.

7. The gripping device as claimed in claim 6, further including recesses formed in said side walls, said rollers when the gripping arms are pivoted into the gripping position moving into said recesses.

8. The gripping device as claimed in claim 1, wherein said piston-cylinder means includes a piston rod to which is connected a control piston having a peripheral surface, the position of which controls the speed of said piston rod.

9. The gripping device as claimed in claim 8, wherein said piston-cylinder means further includes at least one outlet bore and one choke point communicating with the cylinder space of the piston-cylinder means, and wherein said peripheral surface of said control piston closes said outlet bore just before said pivot axis reaches its stop position in which the gripping arms are activated, and again opens said outlet bore when said stop position is actually reached.

* * * * *